US006909987B2

(12) United States Patent
Jung (10) Patent No.: US 6,909,987 B2
(45) Date of Patent: Jun. 21, 2005

(54) METHOD FOR MEASURING TIME OF ACCESSING A WEB SITE THROUGH THE INTERNET AND RECORDING MEDIA FOR STORING A PROGRAM THEREOF

(75) Inventor: Changmo Jung, Seoul (KR)

(73) Assignee: Wooriinternet Inc., Seoul (KR)

( * ) Notice: Subject to any disclaimer, the term of this patent is extended or adjusted under 35 U.S.C. 154(b) by 161 days.

(21) Appl. No.: 10/296,051

(22) PCT Filed: Jun. 19, 2001

(86) PCT No.: PCT/KR01/01046
§ 371 (c)(1),
(2), (4) Date: Nov. 21, 2002

(87) PCT Pub. No.: WO02/075625
PCT Pub. Date: Sep. 26, 2002

(65) Prior Publication Data
US 2004/0034502 A1 Feb. 19, 2004

(30) Foreign Application Priority Data
Mar. 21, 2001 (KR) ........................................ 2001-00447

(51) Int. Cl.[7] .............................................. G04F 1/00
(52) U.S. Cl. ...................................... 702/176; 702/187

(58) Field of Search ................................. 702/176, 187; 705/52, 53, 54, 56, 59

(56) References Cited

U.S. PATENT DOCUMENTS

2003/0040889 A1 * 2/2003 Coffey et al. ............... 702/188

FOREIGN PATENT DOCUMENTS

| JP | 98-340236 A | 12/1998 |
|---|---|---|
| KR | 99-88682 A | 12/1999 |
| KR | 00-17873 A | 4/2000 |

* cited by examiner

Primary Examiner—John Barlow
Assistant Examiner—Stephen J. Cherry
(74) Attorney, Agent, or Firm—Shinjyu Global IP Counselors, LLP (57) ABSTRACT

The present invention relates to a method for measuring the connecting time of a terminal to a site in a communication environment comprising the terminal, site, and a server. The method comprises the steps of generating authentication code and sending it to the user server; authenticating the user when the user server requests for the main server to authenticate the user; recording the time when the user connects with the site; recording the time when the site is changed to another site.

20 Claims, 6 Drawing Sheets

| ID | PW | --- | Adult1 | Adult2 |
|---|---|---|---|---|
| bom as | **** | --- | A | |
| dalja | **** | --- | B | A |
| ttorong | **** | --- | B | B |
| nono | **** | --- | C | |

METHOD FOR MEASURING TIME OF ACCESSING A WEB SITE THROUGH THE INTERNET AND RECORDING MEDIA FOR STORING A PROGRAM THEREOF

TECHNICAL FIELD

The present invention relates to a system integrating various IDs of several web sites using a single ID on Internet, more particularly to a system including a method for measuring the connection time to several web sites and a method of blocking specific sites and double login.

BACKGROUND OF THE INVENTION

There are many types of billing to a user who was furnished contents in case that the user wishes to be provided with contents via accessing a web site through Internet, particularly to be provided with charged content which is highly valuable as information.

Among the various billing processes, it is the predominant way to charge a fixed fee uniformly to all users who registered as members of the web site providing chargeable contents.

In addition, billing agency web sites, which carry out the billing process of another web sites, appeared recently. These billing agency web sites carry out the billing process of the member web sites which requested billing process to the agency and collect fees from the users uniformly. Then, the agency may determine the shares for each of the member sites based on the frequency data about the access of the users.

However, the conventional methods described only charge uniformly to all web sites, therefore the methods have a difficulty to discriminate for billing a web site which provides information of high quality thereby inducing many users to access and another web site which does not.

Like this, the conventional billing system is to charge uniformly by the server, and it is because of the problem of the client program and the impossibility of recording the correct visiting time due to the non-connective characteristic of IP protocol.

SUMMARY OF THE INVENTION

The present invention is to solve the problems of the conventional arts and to provide one-pass ID function integrating login IDs of several affiliate sites and automatic logon function. Moreover, the present invention intends to provide a reasonable billing method which carry out billing processes of several web sites. It is another object of the present invention to provide the double login function to minimize the risk of drain of personal information during login, and the present invention provides additional advantage of blocking the connection to the specific sites.

To achieve the above objects, the method for measuring the connection time of a user terminal to a site via a communication network in a communication environment comprising said user terminal, a server of said site, and a server of a service provider which are connected to each other via said communication network, according to the present invention, comprises the steps of (1) generating and transmitting an authentication code to said user terminal if a user is certified to be a registered member with reference to the identification information for said user by said server; (2) determining a user authentication result by said server of the service provider if said server of the site in which said user terminal is connected requests the user authentication by transmitting the user's ID and said authentication code; (3) recording, in response to that said user terminal informs that said connected site is included in the registered site list to said server of the service provider, an accessing time point by said server of the service provider; and (4) recording an changing time point with reference to the information about said changing time point by said server of the service provider if said user terminal transmits the information about said changing time point to said server of the service provider in the case that the changed address is not included in the address of said connected site when the address of the connected site is changed.

On the computer-readable recording medium where a program operable on a user terminal is recorded, said program being able to measure the connection time of said user terminal to a site via a communication network in a communication environment comprising said user terminal, a server of said site, and a server of a service provider which are connected to each other via said communication network according to the present invention, the program operable on a user terminal performing the steps of (1) transmitting identification information for a user to said server; (2) transmitting an authentication code to said server of the site if said authentication code generated on said server of the service provider after said user is certified to be a registered member with reference to the identification information is received; (3) receiving user authentication result if said server of the site transmits said user authentication result for received user's ID and said authentication code; (4) recording information for the list of registered sites upon receiving said information; (5) informing said server of the starting time point of access to said site only if said site is included in said list of registered sites in response to accessing said site by an operation of said program for connecting to the site; determining, in response to changing of the connection address of said program for connecting to the site, whether the changed address is within said site; and (6) informing said server of the information for the time point when the address is changed, only if it is determined that the changed address is not within the site by the user terminal is recorded.

On the computer-readable recording medium where a program operable on a server of a service provider is recorded, said program being able to measure the connection time of said user terminal to a site via a communication network in a communication environment comprising said user terminal, a server of said site, and said server of said service provider which are connected to each other via said communication network according to the present invention, the program operable on a server of a service provider performing the steps of (1) determining whether said user is a member with reference to the identification information for said user received from said user terminal; (2) generating an authentication code and transmitting to said user terminal if said user is a member; (3) performing an authentication process for said authentication code if an authentication request is received from the server of said site in which said user connected; (4) providing the information about the login permission of the member to the server of said site after said authentication process; (5) transmitting information for a list of registered sites of said user to said user terminal if login is permitted in said step; (4) recording a time point of access in response to being informed of the fact that said user terminal accesses said site from said user terminal; and (c) recording the time point of change by referring the information for the time point when the address is changed which is received from said user terminal is recorded.

<DESCRIPTION OF THE SYMBOLS OF THE DRAWINGS>

301: operating system
303: web browser program
305: agent program
307: web browser plug-in program

DETAILED DESCRIPTION

1. Communication Environment in Which the Present Invention is Applied

Figure 1:
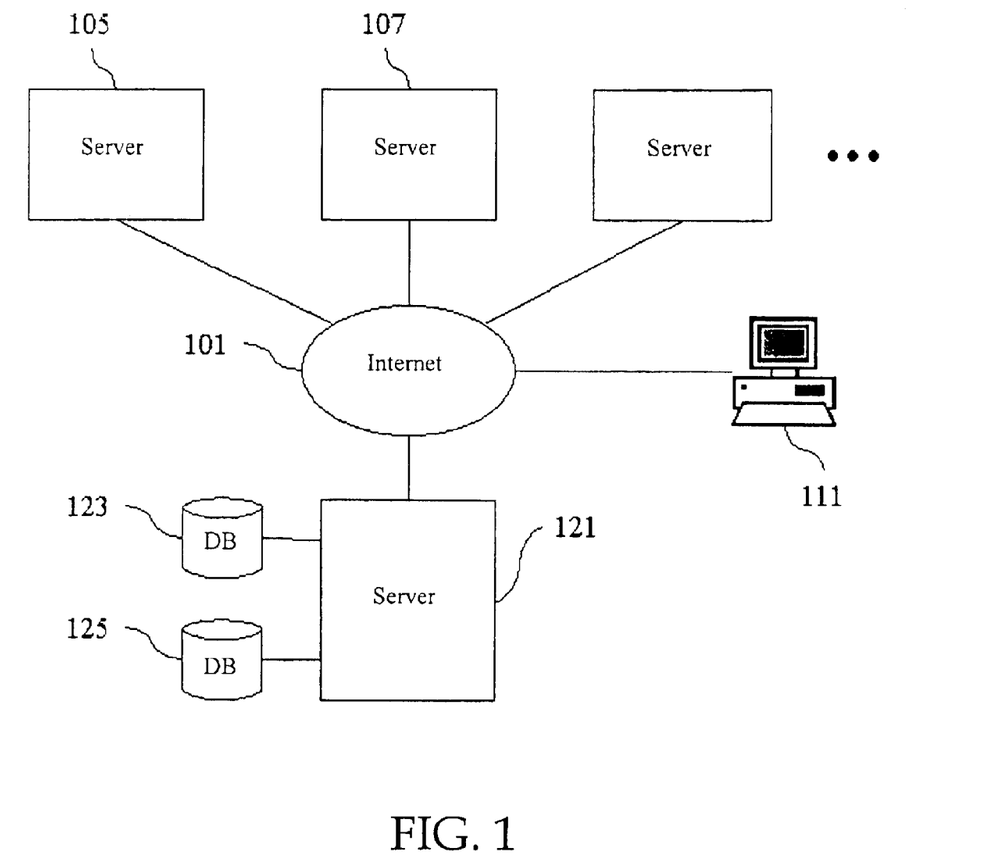
FIG. 1 is a block diagram illustrating the communication environment in which the method for measuring the connection time to a specific web site providing chargeable contents through the Internet according to the present invention is applied.

FIG. 1 is a block diagram illustrating the communication environment in which the present invention is applied.

As shown in FIG. 1, the present invention relates to a method for measuring the time period in which a user remains connected after accessing to servers 105 and 107 of web sites providing contents using a user terminal 111 for each of the servers 105 and 107 of several web sites providing contents accessible via Internet 101.

In FIG. 1, the communication network in which the present invention is applied is shown as Internet 101, but the present invention is not applied only to the Internet 101 based on Internet protocol. The Internet 101 used in this specification should be interpreted in a broad sense as communication network which is able to perform the functions corresponding to Internet 101 including intranet, local area network, wide area network, private network, or wireless network, etc.

In addition, servers 105 or 107 of web sites providing contents and the web browser program as the program for connecting to the server of the web site are cited as examples in the following description. However, the concept of the present invention is not limited to be applied to the servers of the web sites and web browser programs. As apparent from the following description, the idea of the present invention is applicable to all kinds of access points accessible via various communication networks and all kinds of access programs used to access said access points. In this specification, an access point accessible through a communication network is called as a site. Moreover, data in which the terminal can download and display after accessing to the site are called as "pages". If the server of the site in the specification is a sever of a web site based on World Wide Web protocol, the program for accessing to the site is a web browser program and the page is a web page. It is considered that the server of the site in the specification is a server of a web site as an example.

According to the first embodiment to implement the idea of the present invention, a server 121 of a service provider measures the connection time of the user to a specific web site. An administration program is executed on the server 121. It is preferable that the server 121 is equipped with a user database 123 for recording information for the user registered to the server and a web site database 125 for recording information for the web site registered to the server. In this specification, the one embodying the method according to the present invention using the server 121 is called as a "service provider".

According to the first embodiment of the present invention, a user performs a registration process after accessing to the server 121. Information for the user is recorded to the user database 123 of the server 121 through the registration process. The user database stores the list of the affiliate companies in which the user joined, and the starting and closing time points of access for each of the servers providing contents of the affiliate companies for each of the users registered to the server 121.

Figure 3:
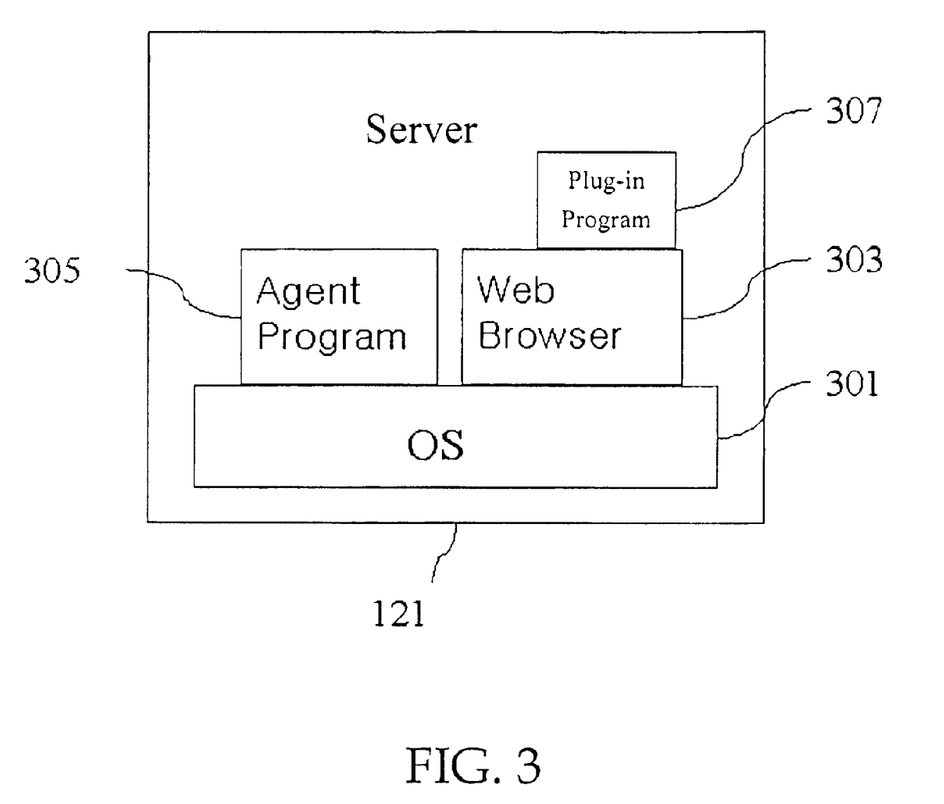
FIG. 3 illustrates an instruction system with the operating system (OS) and web browser program when the agent program and web browser plug-in program according to the present invention are executed on the user terminal 111.

An agent program 305 and/or web browser plug-in program provided from the server 121 via communication network 101 or any other way is preferably executed on the user terminal 111.

FIG. 3 shows an instruction system with the operating system (OS) and web browser program when the agent program 305 and web browser plug-in program according to the present invention are executed on the user terminal 111. As illustrated in FIG. 3, the web browser program 303 for browsing internet web sites is executed on the operating system 301 for interfacing to the driving and I/O devices of the user terminal 111. Moreover, it is preferable that the agent program 305 is executed under the control of the operating system 301. The web browser plug-in program is preferably executed corresponding to the web browser program 303 under the control of the web browser program 303.

It is preferable that the agent program 305 measures the connection time of the user terminal 111 to the server 105 of the web site providing contents while communicating with the administration program of the server 121 in the state that the agent program 305 is executed on the terminal 111 under the control of the operating system (OS) of the user terminal 111. The user may download the agent program according to the present invention from the server 121 after or with the user registration. The user may download the plug-in program 307 operating with the web browser with the agent program 305 from the server 121.

The agent program 305 and web browser plug-in program 307 can be installed and executed on the user terminal 111 customized to the type of the computer and the operating system (OS) of the user terminal 111.

According to a preferred embodiment, the agent program 305 is executed standby mode under the control of the operating system (OS) or started with the opening of the web browser program for accessing to the server of the web site providing contents. The web browser plug-in program is executed with the operation of the web browser.

It is preferable that the server 105 or 107 of the web site, which wants to be provided with the connection time measurement service, registers to the server. The information for the server of the web site providing contents is recorded to the web site database 125 of the server 121 via the registration process.

Start and Initialization of the Web Browser

Figure 2:
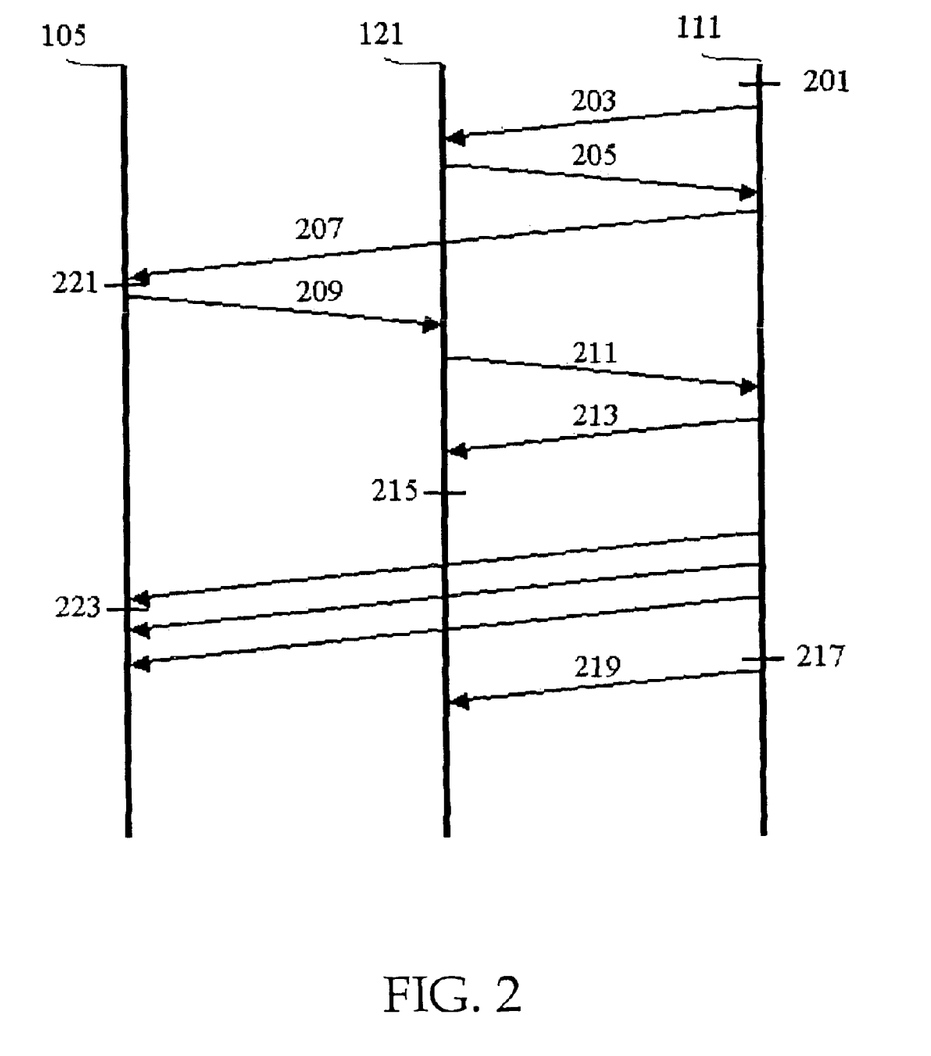
FIG. 2 is a time-series shows the process of the method for measuring the connection time of a user using a terminal 111 to a specific web site 105 providing chargeable contents according to a preferred embodiment of the present invention.

First, the user starts the web browser program 303 installed on the terminal 111 (201). The agent program 305 is preferably started simultaneously with the web browser program 303 or is executing in stand-by mode under the control of the operating system 301 before the start of the web browser program 303 on the terminal 111. The user terminal 111 preferably stores the identification information to identify the user. The identification information of the user is stored as a form of resource file, and it can be read and transmitted if only the authentication process of the agent program completes the authentication for the user.

If the agent program 305 starts, the agent program 305 accesses to the server 121 simultaneously with or after the start, and transmits the identification information of the user who executes the web browser program 303 to the server 121 (203). The server 121 reads the information for the user corresponding to the identification information from the user database 123 by referring the received identification information. Then, the server 121 extracts the affiliate company list in which the user registered, and transmits the list to the user terminal 111 (205).

According to the present invention, the agent program 305 and the server 121 communicates to each other and determines the starting and closing time points of access to measure the connection time of the user terminal 111 to the server 105 or 107 of the web sites providing specific contents. To do this, it is preferable that the agent program 305 and the server synchronize each of the system clocks. According to the first embodiment of the present invention, the agent program 305 transfers the information for the current time, which is set according to the clock of agent program 305 itself or the system clock of the terminal 111 on which the agent program is executed, to the server 121. Then, the server 121 receives the information for the current time of the agent program 305, compares it to the current time of the server 121, and records the information for the time difference. The server calculates and records the time difference between the user terminal and the server based on the information for the current time of the user terminal 111 received from the user terminal 111 and the current time of the server based on the system clock of the server 121. The server can calculate the absolute connection time based on the information for the time difference between the server 121 and the agent program which has already recorded after receiving the starting and closing time points of access from the agent program.

According to the second embodiment of the present invention, the connection time is measured at the user terminal 111. In general, the user terminal 111 has local time, and the local time is a system counter uncontrollable by the user. According to the second embodiment, the user terminal 111 adjusts the system counter to the server 121, measures the starting and closing time points of connection to the server 105 or 107 of the web site providing contents, and determines the connection time to the server of the web site based on the measurement results. The starting point of connection is set to the login time point to the server or the starting time point of the web browser program 303 as a standard time.

The information in which the user stays to the server 105 or 107 of the web site providing specific contents, for example, the connection time is transmitted to the server 121. The information may be transmitted and recorded to the server 121 in real time, i.e. the information is transmitted whenever the event occurs, or gathered reports may be transmitted at a time. The transmission schedule of information to the server is preferably determined in the view of the traffic control. However, it is preferable that the information is immediately transmitted to the server 121 when the agent program 305 is logout.

The agent program 305 remains the status that can refer the member web sites list during the web browser program 303 is executing. Moreover, the web browser plug-in program watches the server 105 and 107 of the web sites providing specific contents to which the web browser program 303 connects and transmits the information thereof to the agent program. The agent program 305 determines if the connected web site is a registered web site to the web sites list of the user or not from the information for the server 105 or 107 of the web site providing specific contents received from the web browser plug-in program.

Connection to the Specific Web Site

The user connects to the server 105 of the web site providing specific contents among the web sites registered to the web sites list using web browser (207).

User Authentication

The server 105 of the web site requests user authentication to the server in response to the access request from the web browser on the user terminal 111 (209). According to an embodiment of the present invention, the user login process to the server 105 of the web site providing contents may be performed on the server 121. According to another embodiment of the present invention, the user login processes to the servers 105 and 107 of the web sites providing contents registered to the server 121 may be performed on the server 121 collectively. This is called as "one-pass method". In the followings, the administrator of the server of the web site providing contents is called as the "affiliate company".

Then, the server 121 performs the user authentication process via web browser (211). The web browser may display the user authentication page administrated by the server by opening another window or may use the same window. The user transfers the information needed for the user authentication via web browser to the server 121 (213).

The server 121 determines whether the user is a valid member by referring the member list of the corresponding web site recorded on the web site database 125 after receiving the information for the user authentication (215).

Double Login

Figure 4:
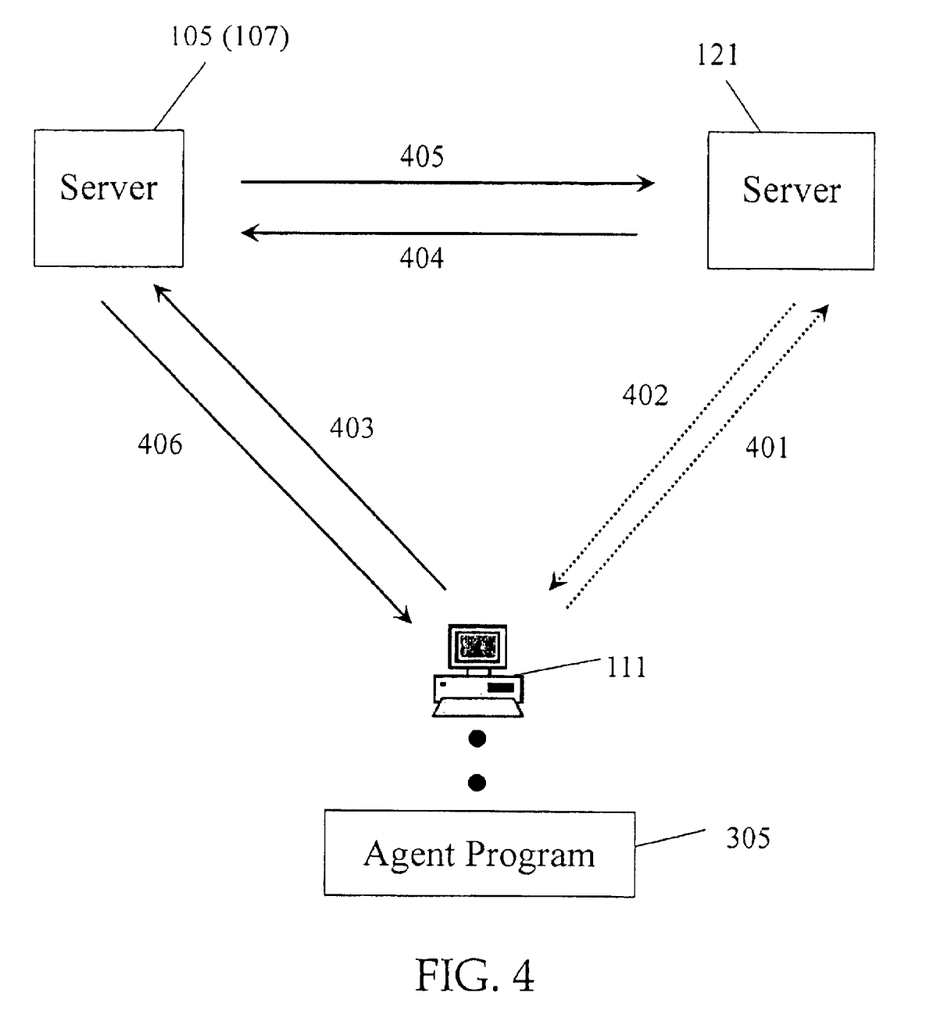
FIG. 4 is a schematic diagram of the login system according to the present invention.

In addition, according to the present invention, the user logins the server 121 via the agent program 305 etc. and he or she is authenticated primarily. Then, the secondary authentication via the authentication code system invisible to the user is performed between the server 121 and the server of the web site of the affiliate company when the user logins the server of the web site of the affiliate company. By using the above described double login system, the personal information of the user is protected more safely in the Internet environment easily exposed to hacking.

FIG. 4 is the schematic diagram of the login system according to the present invention. The login process is described with reference to the drawing.

The user starts the first authentication process to connect to the server 121 via the agent program 305 etc. If the login process to the server 121 is successful, the server generates a random number used as the authentication code automatically. The authentication code is generated based on several variables depending on the connection environment, connection time, etc. for each user other than the serial number form in regular sequence. The information except the personal information may be coded into the authentication code. The internal authentication algorithm generates the authentication code.

The authentication code is generated whenever the user connects to the server 121. Though the authentication code is copied or drained, login is permitted only if the ID, password and authentication code are all TRUE and the login is prohibited if any of those information is discord.

The authentication code as generated above is transmitted to the user terminal 111 (402). Next, the user connects to the server 105 or 107 of the affiliate company (403). The second authentication is requested by transmitting the coded user ID and authentication code to the server 121 when the user connects to the server of the affiliate company (404). The information of the login permission of the user is provided to the affiliate company after the approval of the ID and authentication code requested to be authenticated (405). Finally, the login permission result is transmitted to the user terminal 111 after it is determined whether the login is permitted or prohibited based on the information from the server 121 (406).

According to the double authentication system described above, the authentication process is performed automatically in the background without any action of the user for user convenience, and therefore the user does not feel any inconvenience from such double authentication system.

Moreover, the authentication process of the authentication code of the agent program 305 is performed on the server 121 and only the user ID and result value are transmitted to the server of the affiliate company. Therefore, the personal information may not drain between the server providing the service according to the present invention and the affiliate company.

2. Process for Measuring Connection Time to the Web Site According to the Present Invention In the time-series of FIG. 2, the process of the method for measuring the connection time of a user using a terminal 111 to a server 105 of the web site providing specific contents according to a preferred embodiment of the present invention. Now, the process of measuring the connection time of a user to the server of the web site providing specific contents, operation of the agent program and plug-in program installed to the user terminal, and the communication process between the agent program and the administration program of the server are described by referring FIG. 2. In the following description, it is assumed that the user completed the user registration process to the server and the server 105 of the web site providing specific contents also completed the web site registration.

Record the Starting Time Point of Access

If it is determined that the web site 105 which requested user authentication is a web site of the affiliate company in which the user registered in advance according to the result of the user authentication, the starting time point is recorded to the server 121 considering that the user starts access to the corresponding server of the web site of the affiliate company via web browser.

There are various methods to determine the starting time point of access in the range of the present invention.

According to an embodiment, the server 105 of the web site providing contents informs the server 121 of the very first accessing time point of the user, the server records it as the starting time point of access. More specifically, the time point when the web browser program 303 attempts to connect to the address included in the server 105 of the web site providing contents and the web page corresponding to the address is started to display on the display window administrated by the web browser program may be the starting time point of access.

According to another embodiment, the server 121 records the time point when the web browser is allowed to access to the contents of the server 105 of the web site providing contents after the user authentication is completed upon request of the user authentication from the web site 105. More particularly, the server 121 performs further step of performing user authentication in response to the user authentication request from the server 105 of the web site providing contents. In this embodiment, the server 121 records the time point when the user authentication process of the accessed user to the server 105 of the web site providing contents is completed as the starting time point of the access.

According to the second embodiment of the present invention described above, the starting time point of connection to the server of the web site providing contents is measured by the user terminal 111.

If it is determined that the web site 105 which requested user authentication is a web site of the affiliate company in which the user registered in advance according to the result of the user authentication, the user terminal 111 measures the starting time point of connection considering that the user starts access to the corresponding server of the web site of the affiliate company via web browser. At this time, the system counter of the user terminal 111 which measures the starting time point of connection is preferably set to the time of the server.

Or, the time point when the web browser program 303 attempts to connect to the address included in the server 105 of the web site providing contents and the web page corresponding to the address is started to display on the display window administrated by the web browser program may be the starting time point of access.

Record the Closing Time Point of Access

If the user closes the connection to the server 105 of the web site providing contents, the closing time point is recorded on the server 121.

According to the first embodiment described above, the process of recording the closing time point of access is as follows. The web browser plug-in program watches the connection status of the web browser and transmits the change of the address to the agent program 305 whenever the address changes in the web browser. The agent program 305 determines whether the changed address is within the server of the web site of the affiliate company at that time the access is started when the address of the connected server of the web site of the web browser. If the changed address is not within the server of the web site of the affiliate company, the agent program determines that the access is closed (217). Then, the agent program 305 informs the server 121 of the time point determining that the access is closed (219), and the server 121 receives and records it to the user database 123.

The starting and closing time points of access to the specific web site for the user are recorded on the affiliate company list of the server through the successive processes described before.

According to the second embodiment of the present invention described above, the user terminal 111 measures the closing time point of connection to the server of the web site providing contents. Similar to the measurement of the starting time point of connection, the system counter of the user terminal 111 which measures the closing time point of connection is preferably set to the time of the server 121.

Calculation of the Connection Time

The server 121 accumulates the starting and closing time points of access to the specific web site 105 for the terminal 111 for each of the web sites of the affiliate companies through the successive processes described before.

In the first embodiment described above, that is, in the case that the starting time point of access is determined depending on the system clock of the server 121 and the closing time point of access is determined depending on the system clock of the terminal 111, the local time difference between the server 121 and the terminal 111 should be reflected to the calculation of the connection time. That is, according to an embodiment of the present invention, the server 121 performs a further step of calculating and recording the time difference between the user terminal 111 and the server 121 based on the information for the current time of the server based on the system clock of the server and the information for the current time of the user terminal 111 received from the user terminal 111. Then, the server calculates the connection time of the terminal 111 to the server of the web site providing specific contents using the starting and closing time point of access and the time difference.

As described above, the agent program 305 installed to the user terminal 111 measures, encodes and records the all information about the web sites in which the user surfs in real time without any influence to the network according to the present invention.

According to the second embodiment of the present invention, the staying information for the server of the web site providing specific contents based on the starting and closing time points of connection recorded on the user terminal 111 is transmitted to the server 121. The information may be transmitted and recorded to the server 121 in real time, i.e. the information is transmitted whenever the event occurs, or gathered reports may be transmitted at a time. However, it is preferable that the information is immediately transmitted to the server 121 when the agent program 305 is logout.

3. Modified Embodiment of the Present Invention

According to another embodiment of the present invention, a method for measuring connection time using the exclusive program when the user accesses to the specific web site using a separate exclusive program other than the web browser is provided. Operation and processes of this embodiment are similar to those of the embodiment described above, however, it is preferable that the other means corresponding to the web browser plug-in program other than that is provided. Now, the means for performing the functions of the web browser plug-in program is described in detail.

According to an embodiment of the present invention, a resource program, which is able to watch the start of the exclusive program under the control of the operating system 301, may be used. Such resource file is preferably recorded on the terminal as a file which can be referred during the operating system is executing. Moreover, the resource file has a function activated with the start of the program linked to the resource file. Therefore, the agent program may perceive the start of the exclusive program linked to the resource file by monitoring the activation of the resource file.

For example, the case that the Windows series operating system developed by the Microsoft is installed and executed on the computer is described as an example. A resource file watching the start of the program having function for accessing to a specific web site and the access to the specific web site under the control of the operating system, for example, a resource file whose name is sgared.dll may be recorded on the terminal.

According to another embodiments of the present invention, it is possible that the server 121 and the agent program 111 carry out as proxy the login and authentication processes to the server of the web site providing contents within the registered web sites collectively. That is, if the server 121 and the agent program 111 perform the login and authentication processes of the user once, additional login and authentication processes to the web site registered to the server 121 among the web site in which the user registered becomes needless. Such function may be performed by the agent program described above with the method for measuring connection time to the web site described above and this is the unique advantage of the present invention.

4. Function of Blocking Specific Sites

According to the present invention, a function of blocking access to the server of the specific sites. The method blocks access to the server of the sites listed separately on the agent program 305 though the sites do not belong to the affiliate companies of the service provider.

According to the above method, another person is blocked to access to the sites in which a specific person inputted by the specific person inputting the password of the agent program 305 and inputting the address of the web site to the agent program 305.

Figure 5:
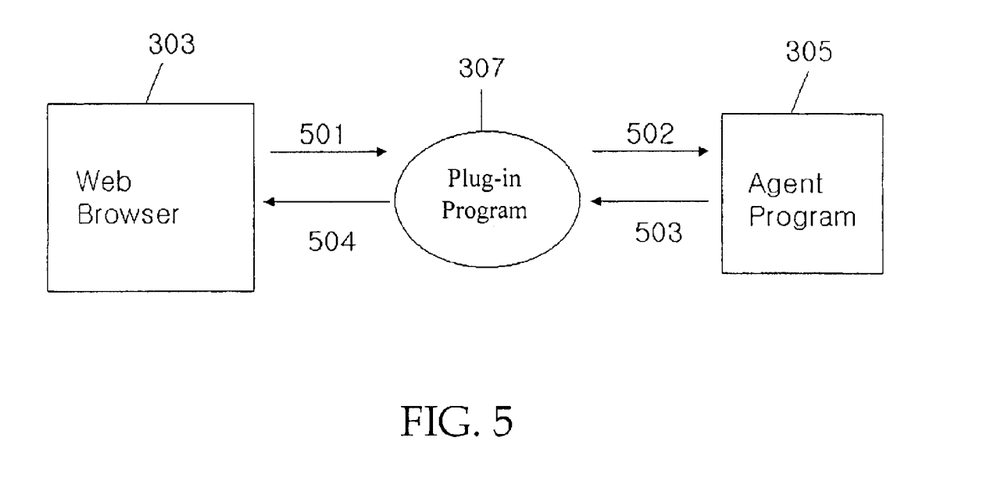
FIG. 5 is a schematic diagram showing the blocking process to the specific sites according to the present invention.

FIG. 5 is a schematic diagram showing the interaction between the web browser, plug-in and agent program in performing the function of blocking access to the specific sites.

According to the above method, a plug-in added to the agent program 305 detects the site address of the web browser and moves to the warning window automatically if the site address is the blocking site.

The above blocking process is described with reference to FIG. 5.

The plug-in detects the URL of the web browser if the user inputs the address of the web site on the web browser (501). The plug-in transmits the detected URL to the agent program 305 (502). The agent program 305 compares the detected URL to the URLs of the sites registered as the blocking sites on the agent program 305. If the detected URL is the same as one of the registered URLs, the URL is replaced with the warning page URL, and if the detected URL is different from the registered URLs, the detected URL is returned. Then, the agent program 305 transmits the URL value to the plug-in (503). Next, the plug-in inputs the received URL value by force. Therefore, if it is tried to connect to the web site registered as the blocking sites on the agent program 305, then the warning page is displayed, and if not, inputted web site is normally displayed.

Now, the method of blocking adult contents is described.

There may be the sites including contents for adults among the affiliate companies. In this case, children's access should be blocked. The affiliate company displays the check window for certification of adult before providing the adult contents when the user connects to the web site of the affiliate company. It is preferable that the affiliate company installs the program such as Active-X in advance of providing adult contents.

Figure 6:
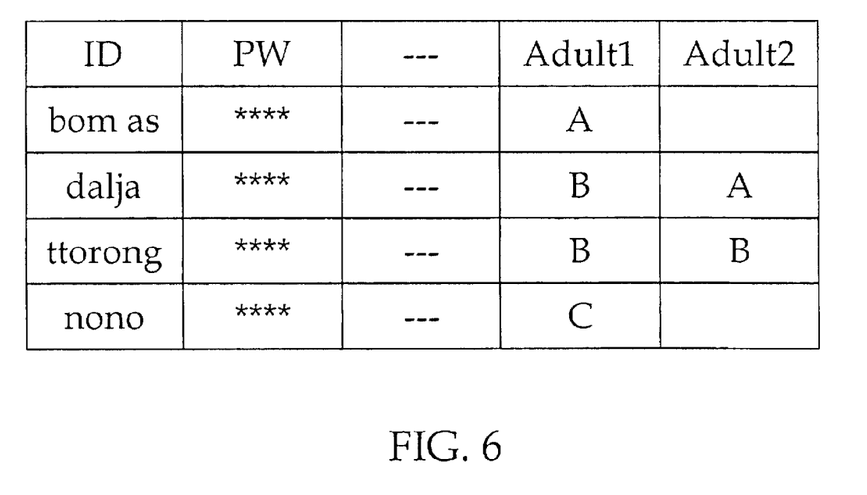
FIG. 6 is a diagram illustrating an example of the blocking process to the adult contents according to the present invention.

Adult grade is given if the connected user is an adult, and juvenile grade is given if the connected user is not an adult. According to the present embodiment, the adult grade is denoted as "A", and the juvenile grade is denoted as "C". In addition, locking function can be set. The case that the locking function is set is denoted as "B", and the case that the locking function is not set is denoted as "D". If the locking function is set, the locking value is recorded in the locking field (Lock: b, Unlock: d).

Therefore, the contents of the adult web sites are visible in case that the locking state is B-d, but the contents of the above adult web sites are invisible in case that the locking state is B-b. The locking state returns to the initial value B-b when the user logouts.

The process is preferably operated in the foregoing part of the adult directory of the affiliate company. If the user accesses to the content of the adult directory, the page moves according to the user setting and the certification process is performed according to the message displayed on the above page.

FIG. 6 shows an example of database in which the above embodiment is applied. In FIG. 6, "A" and "B" indicate adults, and "C" indicates juvenile. "A" adult can see the adult contents page, "B" adult can see the adult contents page with a separate authentication process, and "C" cannot see the adult contents page since he or she is under age.

If a user access to the adult contents page of the affiliate company, Active-X installed on the server of the affiliate company is activated and gets the adult information. Active-X returns the value of Adult 1 in the case that the value of Adult 1 is "A" or "C", and the value of Adult 2 in the case that the value of Adult 1 is "B".

In the case that the return value is "A", the affiliate company opens the adult contents page. However, the affiliate company displays the messages such as "You cannot use this contents" without opening the adult contents page if the return value is "C". In the case that the return value is "B", the user can see the adult contents after the user moves to the adult authentication page and pass the authentication process to change the value of Adult 2 from "B" to "A" if the authentication is successful.

The grade is determined based on the personal identification number entered through the registration process. The real name confirmation process may be additionally performed to prevent the registration using a false personal identification number generated by the personal identification number generator, etc. The grade information may be updated automatically based on the personal identification number of the user. That is, the grade is automatically changed to adult grade if the user was an under age at the time of registration and becomes the adult with the passage of time. "A" and "B" grades can be changed on demand via the circumstances setting, etc.

5. Function of Time Limit of Web Surfing

Figure 7:
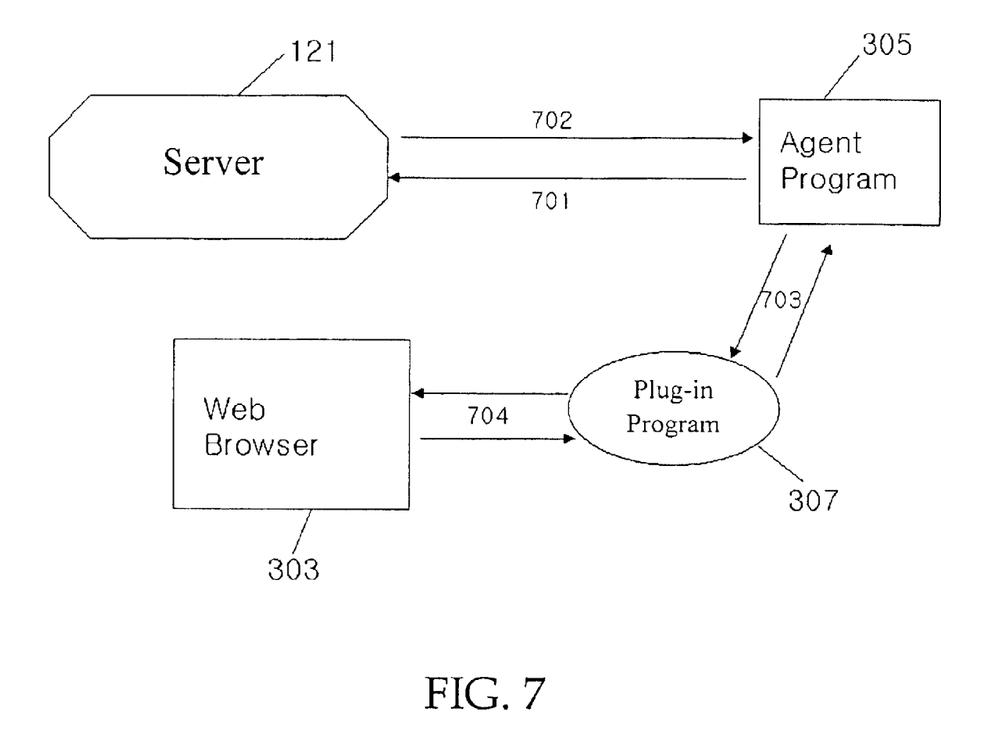
FIG. 7 is a schematic diagram showing the process of restricting the web surfing time according to the present invention.

According to the present invention, a function of time limit of web surfing is provided. According to the method, the function of making use of a specific time zone and the function of limiting the time period of surfing.

FIG. 7 is a schematic diagram illustrating the logic for implementing the above method. Now, the method of limiting the web surfing time is described with reference to FIG. 7.

The time-limit function for the user is performed using the time of the server 121 as a standard when the user logins the server 121 of the service provider. The plug-in monitors the operation of the web browser and transmits to the agent program 305. The agent program 305 compares the operation of the web browser transmitted from the plug-in to the time from the server 121, and sends a warning page URL to the plug-in to control the web browser in force if the time is not available.

The warning page has a window for inputting a password to provide a temporary interruption function.

6. Additional Functions

According to the present invention, the following additional functions are provided though they do not constitute the essential part of the present invention. For example, the agent program 305 may have the function of informing news, stock information, event information, and advertisement, etc. In addition, the customized information and advertisement can be provided according to the specific condition such as age and sex based on the user information entered at the time of registration.

Industrial Applicability

According to the present invention, reasonable billing method for the user access is provided to a plurality of web sites.

More specifically, it is possible to measure the connection period and the accessing time point for each of the users as well as the accessing frequencies. Eventually, it is possible to re-process the information for the users' accessing practice and frequency to be more valuable based on such information.

Secure login in which the process and information are not exposed to hacking is provided by double login. The time-limit function of restricting access time to the web site and blocking function to the specific sites providing adult contents are also provided.

What is claimed is:

1. A method for measuring user terminal to site connection time comprising:

generating and transmitting an authentication code to a user terminal of a user, said user terminal being connected to a site via a communication network in a communication environment including said user terminal, a first server of said site, and a second server of a service provider being connected to each other via said communication network, said user being certified to be a registered member with identification information for said user being configured to be referenced by said second server;

determining a user authentication result by said second server when said first server requests user authentication by transmitting said identification information and an authentication code;

recording an accessing time point of said second server in response to said user terminal informing said site being a connected site being included in a registered site list of said second server; and recording a changing time point by referencing information about said changing time point by said second server, said user terminal transmitting said information about said changing time point to said second server when a changed address is not included in an address of said connected site when said address of said connected site is changed during connection.

2. The method according to claim 1, wherein said authentication code is generated as a random number.

3. A computer program being stored on a computer-readable recording medium where operable on a user terminal to measure the connection time of the user terminal to a site via a communication network in a communication environment comprising the user terminal, a first server of the site, and a second server of a service provider which are connected to each other via the communication network, and the computer program comprising:

instructions to transmit identification information for a user to the second server;

instructions to transmit an authentication code to the first server when said authentication code generated on the second server after said user is certified to be a registered member with reference to said identification information is received;

instructions to receive a user authentication result when the first server transmits a user authentication result of said identification and said authentication code;

instructions to record information for a list of registered sites upon receiving said information for said list of registered sites;

instructions to inform the second server of a starting time point of access to the site when the site is a registered site included in said list of registered sites in response to accessing said registered site by connecting to said registered site;

instructions to determine in response to changing of a connection address of a program connecting to said registered site whether said connection address is within said registered site; and instructions to inform the second server of information for a time point when an address is changed when is determined that said connection address is not within said registered site by the user terminal.

4. The computer program according to claim 3, wherein said instructions to inform said second server of said starting time point of access to said registered site is to inform of a time point when a page corresponding to said connection address is displayed on a display window of said program for connecting to said registered site after said program for connecting to said registered site accesses to an address included in said registered site as a starting time point.

5. The computer program according to claim 3, further comprising instructions to transmit current time information based on a system clock of the user terminal.

6. The computer program according to claim 3, wherein said instructions to inform said second server of said starting time point of access to said registered site includes, instructions to receive an address of said registered site when said address is transferred from a plug-in program to connect to said registered site operated to correspond to said program connecting to said registered site by detecting an operation of said program for connecting to said registered site, and said instructions to inform said second server of said starting time point of access to said registered site when said registered site is included in said list of registered sites.

7. The computer program according to claim 3, wherein said instructions to inform said second server of said starting time point of access to said registered site includes, instructions to receive an address of said registered site when said address is transferred from a resource file whose content is changed to correspond to said program for connecting to said registered site by detecting an operation of said program for connecting to said registered site, and instructions to inform said server of said starting time point of access to said registered site when said registered site is included in said list of registered sites.

8. The computer program according to claim 3, further comprising, instructions to determine whether an inputted site is recorded as a blocking site in advance when a user inputs an address of said inputted site, and instructions to block a connection to said inputted site when said inputted site is recorded as said blocking site in advance, and connecting to said inputted site if said inputted site is not said blocking site.

9. The computer program according to claim 3, further comprising instructions to close the connection to said registered site when connection time to said registered site exceeds a prescribed time range.

10. The computer program according to claim 9, wherein said said instructions to close the connection to said registered site is performed by controlling said program for connecting to said registered site.

11. The computer program according to claim 3, wherein said authentication code is a random number.

12. The computer program according to any one of claims 3 to 6, wherein said registered site is a web site based on World Wide Web protocol, and said program for connecting to said registered site is a web browser program.

13. A computer program being stored on a computer-readable recording medium operable on a second server of a service provider is recorded being able to measure a connection time of a user terminal to a site via a communication network in a communication environment comprising the user terminal, a first server of the site, and the second server which are connected to each other via the communication network, the computer program comprising:

instructions to determine whether a user is a member with reference to identification information for said user received from the user terminal;

instructions to generate an authentication code and to transmit to the user terminal when said user is determined to be a member;

instructions to perform an authentication process for said authentication code when an authentication request is received from the first server to which said user connected;

instructions to provide information about login permission of said member to the first server after said authentication process;

instructions to transmit information for a list of registered sites of said user to the user terminal when login is permitted;

instructions to record a time point of access in response to being informed of the user terminal accesses the site as a registered site from the user terminal; and instructions to record a time point of change by referring information for a time point when an address of said registered site is changed that is received from the user terminal.

14. The computer program according to claim 13, wherein said instructions to record said time point of access is to record time point of access when said authentication process of said user is finished as the starting time point of access.

15. The computer program according to claim 14, further comprising instructions to calculate access time to the site of the terminal using said time point of access that has been recorded said time point of change that has been recorded, and said time difference between said time point of access and said time point of change.

16. The computer program according to any one of claims 13 to 15, wherein said registered site is a web site based on World Wide Web protocol, and said program for connecting to registered site is a web browser program.

17. A computer program being stored on a computer-readable recording medium operable on a user terminal to measure a connection time of the user terminal to a site via a communication network in a communication environment comprising the user terminal, a first server of the site, and a second server of a service provider which are connected to each other via the communication network, said computer program comprising:

instructions to transmit identification information for a user to said second server;

instructions to record information for a list of registered sites upon receiving said information for said list of registered sites;

instructions to measure a starting time point of access to the first server when the site is a registered site included in said list of registered sites in response to accessing the first server by an operation of a program to connect to the first server;

instructions to determine in response to changing of a connection address of said program for connecting to the first server whether the changed address is within said first server;

instructions to measure a time point when the address is changed when it is determined that the changed address is not within the first server according to result of the determination; and instructions to transmit information about connection time to the first server based on measurement results of said starting time point of access and said time point when the address is changed to the second server.

18. The computer program according to claim 17, further comprising instructions to set a system counter of the user terminal to the time of the second server.

19. The computer program according to claim 17 or claim 18, wherein said information about connection time is transmitted to the second server.

20. The computer program according to claim 17 or claim 18, wherein reports of said information about connection time are transmitted to the second server.

* * * * *